(12) United States Patent
Trias Lafuente et al.

(10) Patent No.: US 12,544,476 B2
(45) Date of Patent: Feb. 10, 2026

(54) DEVICE FOR DIFFUSING VOLATILE SUBSTANCES

(71) Applicant: ZOBELE HOLDING SPA, Trento (IT)

(72) Inventors: Marina Trias Lafuente, Barcelona (ES); Ruben Garcia Fabrega, Barcelona (ES); Alba Graus Ferrer, Barcelona (ES)

(73) Assignee: ZOBELE HOLDING SPA, Trento (IT)

( * ) Notice: Subject to any disclaimer, the term of this patent is extended or adjusted under 35 U.S.C. 154(b) by 702 days.

(21) Appl. No.: 17/767,112

(22) PCT Filed: Oct. 8, 2020

(86) PCT No.: PCT/EP2020/078267
§ 371 (c)(1),
(2) Date: Apr. 7, 2022

(87) PCT Pub. No.: WO2021/069579
PCT Pub. Date: Apr. 15, 2021

(65) Prior Publication Data
US 2022/0395601 A1    Dec. 15, 2022

(30) Foreign Application Priority Data
Oct. 9, 2019   (ES) .................................. 201930882

(51) Int. Cl.
*A61L 9/12*   (2006.01)
(52) U.S. Cl.
CPC ......... *A61L 9/127* (2013.01); *A61L 2209/133* (2013.01); *A61L 2209/15* (2013.01)

(58) Field of Classification Search
CPC . A61L 9/127; A61L 2209/133; A61L 2209/15
(Continued)

(56) References Cited

U.S. PATENT DOCUMENTS

| 1,974,414 A | 9/1934 | Dupuy |
| 2,246,008 A * | 6/1941 | Rooch .................... A61L 9/12 239/44 |

(Continued)

FOREIGN PATENT DOCUMENTS

| WO | 2006087564 A1 | 8/2006 |
| WO | 2007062698 A1 | 6/2007 |

(Continued)

OTHER PUBLICATIONS

European Patent Office. International Search Report for PCT/EP2020/078267, mailed Jan. 25, 2021, 3 pp.

*Primary Examiner* — Steven J Ganey
(74) *Attorney, Agent, or Firm* — Amster Rothstein & Ebenstein LLP

(57) ABSTRACT

A device for diffusing volatile substances includes a container containing a liquid with the volatile substances, a base element that closes the container, and a wick that is impregnated with the volatile substances. The base element includes an internal channel in which the liquid containing the volatile substances is deposited. A part of the wick placed in the internal channel is impregnated with the liquid containing the volatile substances located in the internal channel.

8 Claims, 1 Drawing Sheet

(58) Field of Classification Search
USPC ................. 239/44, 47, 51.5, 57, 309, 37, 43
See application file for complete search history.

(56) References Cited

U.S. PATENT DOCUMENTS

| | | | | |
|---|---|---|---|---|
| 3,727,840 | A * | 4/1973 | Nigro | ....................... A61L 9/127 239/57 |
| 4,995,555 | A * | 2/1991 | Woodruff | .................. A61L 9/12 239/55 |
| 6,553,712 | B1 * | 4/2003 | Majerowski | ........ A01M 1/2044 239/44 |
| 2014/0306026 | A1 * | 10/2014 | Santini | ................ A61M 16/145 239/44 |
| 2015/0314031 | A1 | 11/2015 | Torres | |

FOREIGN PATENT DOCUMENTS

| | | | |
|---|---|---|---|
| WO | 2012176002 | A2 | 12/2012 |
| WO | 2014114820 | A1 | 7/2014 |

* cited by examiner

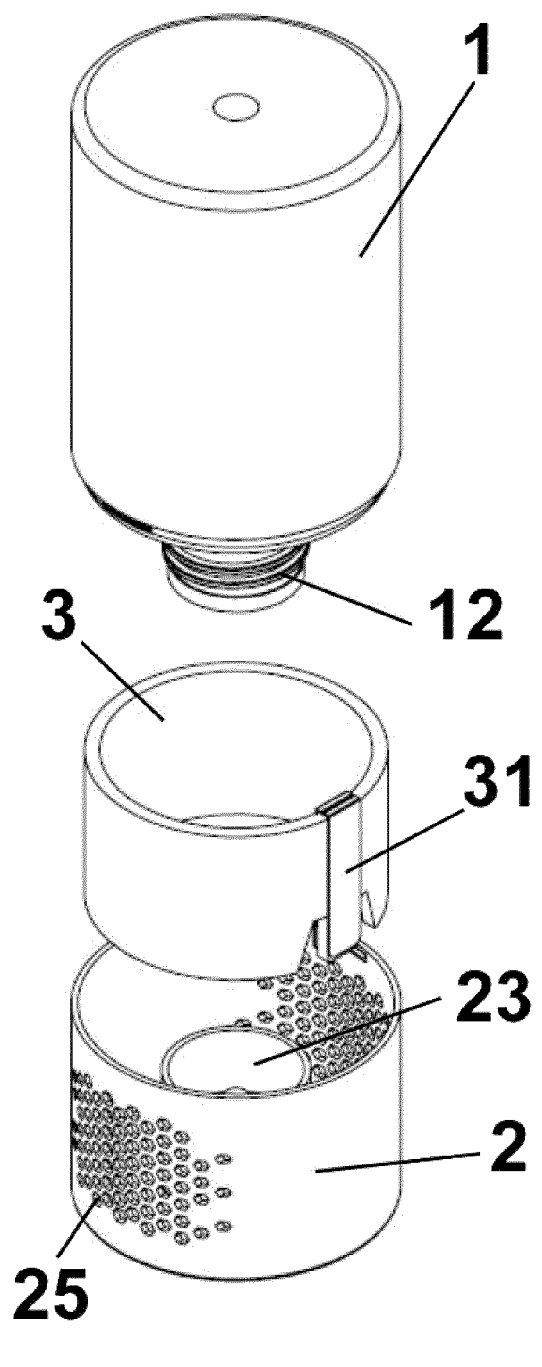
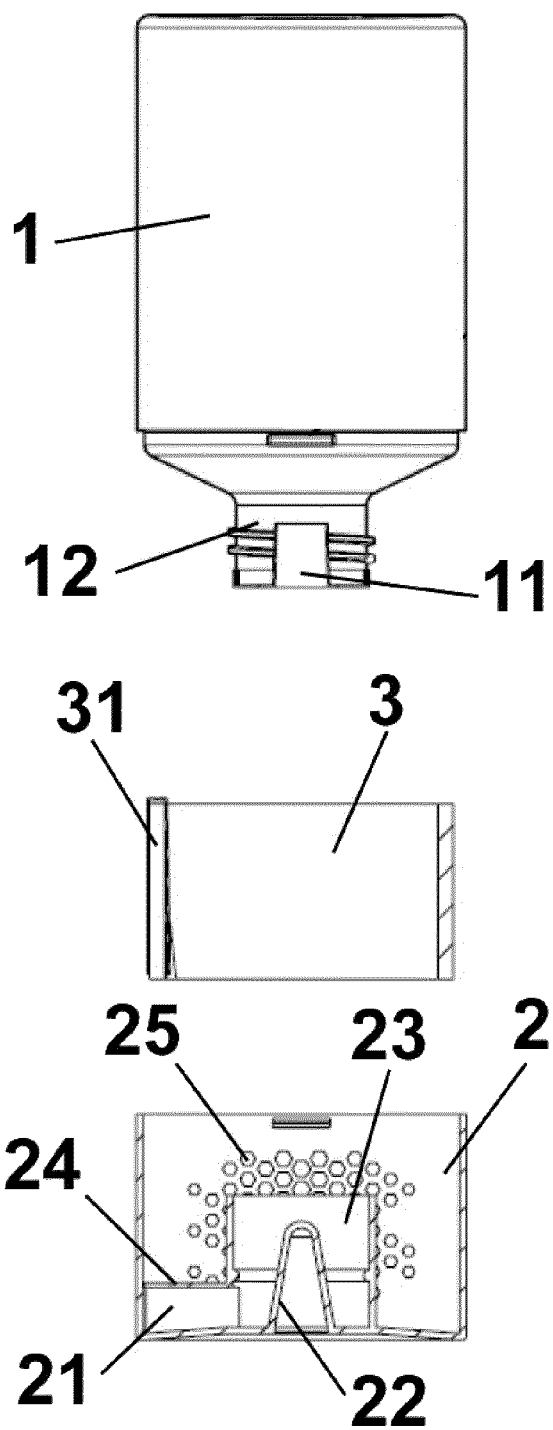

DEVICE FOR DIFFUSING VOLATILE SUBSTANCES

CROSS-REFERENCE TO RELATED APPLICATIONS

This application is a U.S. national stage entry under 35 U.S.C. § 371 of PCT International Patent Application No. PCT/EP2020/078267, filed Oct. 8, 2020, which claims priority to Spanish Patent Application No. P201930882, filed Oct. 9, 2019, the contents of each of which are hereby incorporated by reference in their entirety.

The present invention relates to a device for the diffusion of volatile substances.

BACKGROUND OF THE INVENTION

There are devices on the market for diffusing volatile substances, such as static air fresheners with inverted positioning. As they are products with inverted positioning, the difficulty of the solutions consists in the correct dosage of the volatile substances.

In existing products, this solution usually consists of an intermediate wick fixed to the container by means of a plug.

By placing the bottle on the base, this intermediate wick comes into contact with a secondary wick. The intermediate wick functions as a dispenser, and the secondary wick functions as the evaporation surface.

A drawback of these devices is that the intermediate wick forms part of the fragrance container, so that good contact between the intermediate wick and the secondary wick cannot be ensured.

In addition, another drawback is that dripping may occur at the time of activation, and, in addition, the product is usually single-use.

Therefore, an object of the present invention is to provide a device for volatile substances that is used in inverted position that does not require any intermediate wick or any dosing system.

DESCRIPTION OF THE INVENTION

With the device for diffusing volatile substances according to the invention, the aforementioned drawbacks are solved, presenting other advantages that will be described below.

The device for diffusing volatile substances according to the present invention comprises:
 a container containing a liquid with such volatile substances,
 a base element that closes said container, and
 a wick that is impregnated with said volatile substances, wherein the base element comprises an internal channel in which the liquid containing the volatile substances is deposited, a part of the wick being placed in said internal channel, being impregnated with the liquid containing the volatile substances located in the internal channel.

Advantageously, said base element comprises a window that communicates the internal channel with the rest of the base element Furthermore, said base element comprises a projection that activates an outlet valve for the liquid from the container that allows the liquid to exit the container towards said base element.

The base element also advantageously comprises a guide for guiding a mouth of said container, and the base element also comprises a plurality of evaporation holes, and to facilitate evaporation therethrough.

Advantageously, said evaporation holes are arranged on the side wall of said base element.

Furthermore, preferably said wick comprises a projection that is positioned in said internal channel of the base element, and said projection is located longitudinally in the wick.

According to a preferred embodiment, the wick has a cylindrical shape.

The device for diffusing volatile substances according to the present invention has at least the following advantages:
 It does not require any intermediate wick or dosing system, therefore the device is cheaper than conventional devices;
 It eliminates or minimizes leaks,
 Correct contact between the base element and the wick and the correct evaporation of volatile substances is ensured,
 It allows the replacement of the wick in a clean way.

BRIEF DESCRIPTION OF THE DRAWINGS

For a better understanding what has been stated, some drawings are attached in which, schematically and only as a non-limiting example, a practical case of embodiment is represented.

FIG. 1 is an exploded perspective view of the device for diffusing volatile substances according to the present invention; and FIG. 2 is an exploded longitudinal sectional view of the device for diffusing volatile substances according to the present invention.

DESCRIPTION OF A PREFERRED EMBODIMENT

As shown in the figures, the device for diffusing volatile substances comprises a container 1 containing a liquid with the volatile substances.

Said container 1 comprises a valve 11, which is actuated before the use of the diffusion device, as will be explained later, and a mouth 12 provided with an external thread.

The device for diffusing volatile substances also comprises a base element 2. This base element 2 is used to place the device in an inverted position, that is, with the base element 2 in the lower position, as shown in the figures.

Said base element 2 comprises an internal channel 21 that contains the liquid from container 1. For this, the base element 2 comprises a projection 22 that activates the valve 11 of container 1, opening the outlet of the liquid from said container through the valve 11

The base element 2 also comprises a guide 23, for guiding the mouth 12 of the container 1, provided with an internal thread.

Furthermore, the base element 2 also comprises a window 24, which communicates the internal channel 21 with the rest of the base element, as shown in FIG. 2.

To facilitate evaporation, the base element 2, which is preferably cylindrical in shape, comprises a plurality of evaporation holes 25, which are arranged on the side wall of the base element 2, according to the embodiment shown.

The device for diffusing volatile substances also comprises a wick 3, which is preferably cylindrical in shape, and said wick 3 comprises a projection 31, preferably located longitudinally, which in its position of use is placed with one of its ends located in the internal channel 21 of the base element 2

In this way, according to the embodiment shown, the liquid with the volatile substances is impregnated in the wick 3 through this projection 31, although it could be impregnated in any suitable way without the need for said projection 31.

When it is desired to use the device for diffusing volatile substances according to the present invention, first the wick 3 is placed in its position inside the base element 2, with its projection 31 positioned inside the internal channel 21.

Said wick 3 shall be replaced as many times as necessary, as it is a spare element.

Next, the base element 2 will be coupled to a container 1. In doing so, the projection 22 of the base element 2 shall be inserted into the valve 11, opening it.

By placing the diffusion device in its position of use, that is, in the position represented in the figures with the base element 2 in its lower part, the liquid shall pass through the valve 11 and it shall be placed in the internal channel 24, with the wick 3 being impregnated with said liquid and the volatile substances shall diffuse or evaporate to the environment.

Said diffusion or evaporation is performed through the evaporation holes 25, in the embodiment shown, although it could also be carried out through a gap between the base element 2 and the container 1.

Despite the fact that reference has been made to a specific embodiment of the invention, it is obvious to a person skilled in the art that the device described for diffusing volatile substances is susceptible to numerous variations and modifications, and that all the mentioned details can be substituted by others technically equivalent, without departing from the scope of protection defined by the appended claims.

The invention claimed is:

1. A device for diffusing volatile substances, comprising:
    a container containing a liquid with the volatile substances,
    a base element that closes the container, and
    a wick that is impregnated with the volatile substances, wherein:
    the base element comprises an internal channel in which the liquid with the volatile substances is deposited, a part of the wick being placed in the internal channel being impregnated with the liquid with the volatile substances located in the internal channel; and
    the part of the wick comprises a projection that is placed in the internal channel of the base element.

2. The device for diffusing volatile substances according to claim 1, wherein the base element comprises a window that communicates the internal channel with the rest of the base element.

3. The device for diffusing volatile substances according to claim 1, wherein the base element comprises a projection that activates an outlet valve for the liquid from the container.

4. The device for diffusing volatile substances according to claim 1, wherein the base element also comprises a guide for guiding a mouth of the container.

5. The device for diffusing volatile substances according to claim 1, wherein the base element comprises a plurality of evaporation holes.

6. The device for diffusing volatile substances according to claim 5, wherein the evaporation holes are arranged on the side wall of the base element.

7. The device for diffusing volatile substances according to claim 1, wherein the projection of the wick is longitudinally located in the wick.

8. The device for diffusing volatile substances according to claim 1, wherein the wick has a cylindrical shape.

* * * * *